United States Patent [19]

Choiniere

[11] Patent Number: 5,540,531

[45] Date of Patent: Jul. 30, 1996

[54] PANEL FASTENER

[75] Inventor: Stanley W. Choiniere, Southwick, Mass.

[73] Assignee: Olympic Manufacturing Group, Inc., Agawam, Mass.

[21] Appl. No.: 376,069

[22] Filed: Jan. 20, 1995

Related U.S. Application Data

[63] Continuation of Ser. No. 21,765, Feb. 24, 1993, abandoned.

[51] Int. Cl.⁶ ................................................ F16B 25/00
[52] U.S. Cl. .......................................... 411/387; 411/403
[58] Field of Search ............................. 411/387, 403, 411/404, 405, 919, 399, 410, 481

[56] References Cited

U.S. PATENT DOCUMENTS

| | | | |
|---|---|---|---|
| 2,816,473 | 12/1957 | Labbee, Jr. | 411/919 X |
| 2,982,166 | 5/1961 | Hobbs | 411/399 |
| 3,221,588 | 12/1965 | Wieber | 411/387 |
| 3,236,141 | 2/1966 | Smith | 411/405 X |
| 3,313,197 | 4/1967 | Knohl | 411/387 |
| 3,903,784 | 9/1975 | Dekker | 411/399 |
| 4,041,834 | 8/1977 | Herkes et al. | 411/387 |
| 4,369,609 | 1/1983 | Sheldon et al. | 411/387 |
| 4,477,217 | 10/1984 | Bonacorsi | 411/387 |
| 4,693,654 | 9/1987 | Bettini | 411/387 |
| 4,900,208 | 2/1990 | Kaiser et al. | 411/387 |
| 5,199,839 | 4/1993 | De Haitre | 411/919 X |
| 5,256,019 | 10/1993 | Phillips, II | 411/399 X |

FOREIGN PATENT DOCUMENTS

| | | | |
|---|---|---|---|
| 264357 | 12/1965 | Australia | 411/387 |
| 1442023 | 5/1966 | France | 411/399 |
| 1500748 | 10/1969 | Germany | 411/399 |
| 2228456 | 12/1973 | Germany | 411/403 |
| 1434301 | 5/1976 | United Kingdom | 411/387 |

*Primary Examiner*—Rodney M. Lindsey
*Attorney, Agent, or Firm*—Chilton, Alix & Van Kirk

[57] ABSTRACT

A panel fastener for fastening insulated wall panel to structural lumber or steel comprises an integral wafer head and a shank having a cylindrical segment and a threaded segment. A distal portion of the fastener has a self-drilling tip. A square socket for receiving a torque driver is recessed into the head.

12 Claims, 1 Drawing Sheet

PANEL FASTENER

This is a continuation of application Ser. No. 08/021,765, filed on Feb. 24, 1993, now abandoned.

BACKGROUND OF THE INVENTION

This invention relates generally to fasteners for attaching a panel to a structural support. More particularly, the present invention relates to fasteners for attaching an insulated wall panel to a structural member such as lumber or steel.

Insulated wall panels, which may typically be constructed from lumber facing substrates with an adhesively secured core of insulation, are commonly used in the construction of interior walls, roofs, ceilings and floors of residential, commercial and public structures. The insulated wall panels are typically attached to structural lumber with large common or spiral nails or standard roofing screws. It is common to also employ a washer with the conventional nails and standard screws because of the relatively small head diameters of the fasteners. While conventional screws are ordinarily slightly more difficult to install and require a greater installation time, they tend to have a higher resistance to pull-out than nails. Accordingly, conventional construction techniques ordinarily require more nails than screws for installing a given panel.

SUMMARY OF THE INVENTION

Briefly stated, the invention in a preferred form is a fastener for fastening a panel to a structural member such as lumber or steel. The fastener includes a wafer head and a tapered segment at the underside of the wafer head. A recessed socket opens through the wafer head for receiving a torque driver. The shank of the fastener extends longitudinally from a proximal portion adjacent to the head to a distal tip. The shank has a cylindrical segment and a threaded segment. A drilling point for self-drilling the fastener is disposed at the distal tip.

An object of the invention is to provide a new and improved fastener for fastening insulated wall panel to a structural member.

Another object of the invention is to provide a new and improved fastener which does not require a separate washer for fastening a panel to a structural member.

A further object of the invention is to provide a new and improved panel fastener which has a relatively high resistance to turnout.

A yet further object of the invention is to provide a new and improved panel fastener which may be employed to fasten a panel to a structural member which will allow for a siding to be mounted over the fastener head without the fastener head protruding into or through the siding.

Other objects and advantages of the invention will become apparent from the drawings and the specification.

DETAILED DESCRIPTION OF THE PREFERRED EMBODIMENT

Figure 1:
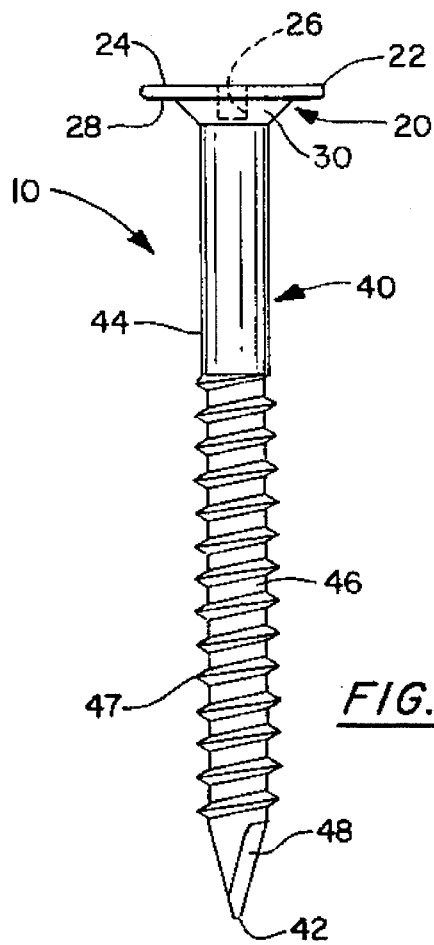
FIG. 1 is a side elevational view, partly in phantom, of a panel fastener in accordance with the present invention.
Figure 2:
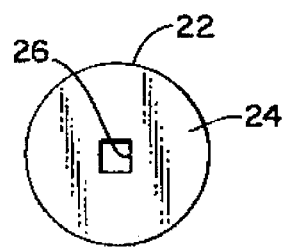
FIG. 2 is a top plan view of the fastener of FIG. 1.
Figure 3:
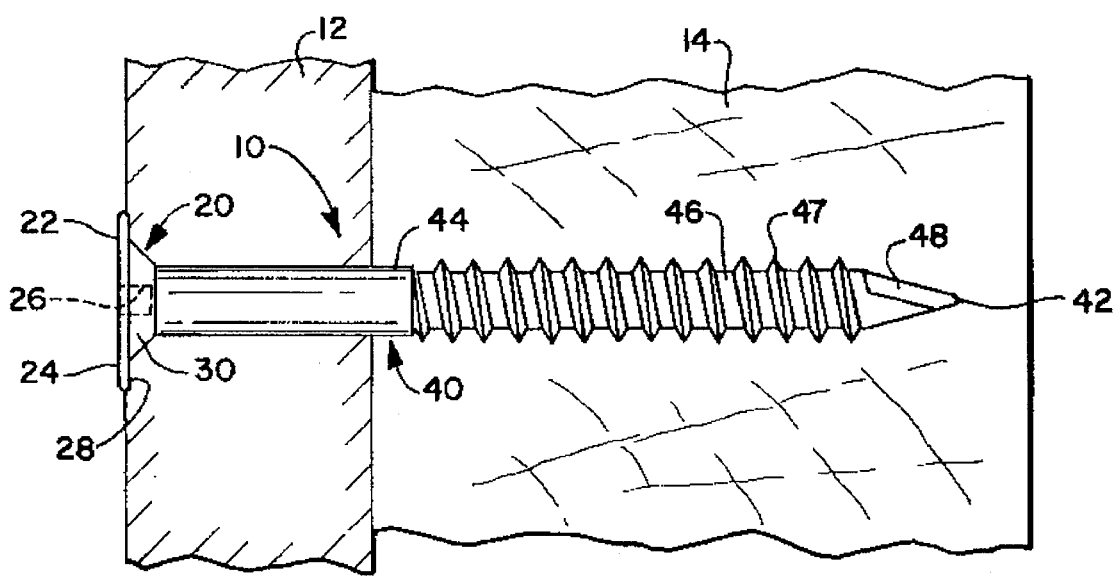
FIG. 3 is a sectional view of the fastener of FIG. 1 and a portion of a panel and a structural lumber support, said fastener installed for fastening the panel to the structural lumber.

With reference to the drawings wherein like numerals represent like parts throughout the Figures, a panel fastener in accordance with the present invention is generally designated by the numeral 10. Panel fastener 10 is particularly adapted for attaching an insulated wall panel 12 to a structural member, such as structural lumber 14 (as illustrated in FIG. 3) or a structural steel support (not illustrated). The insulated wall panel 14 may typically be a composite panel formed from lumber and insulation substrates and which has very favorable insulating features as well as substantial structural load bearing capabilities.

The fastener has a head 20 which includes a wafer-like circular flange 22 having a generally planar top surface 24. The wafer flange 22 typically has a constant diameter between 0.500 and 1.00 inches. The flange 22 has an axial thickness of less than 0.100 inches. A recessed axial socket 26 for receiving a torque driver (not illustrated) is centrally disposed in the head. The socket 26 opens through the surface 24. In a preferred form, the socket is a square recess. The socket 26 may also have various polygonal shapes or have the form of a recessed Philips slot. The underside 28 of the flange retentively engages the outer surface of the panel 14. A tapered conical section 30 extends axially at the underside 28.

The fastener has a shank 40 which axially extends from the tapered section 30 to a distal tip 42. A proximal segment 44 of the shank has a substantially cylindrical form of uniform diameter. A threaded segment 46 having a helical thread 47 extends from the terminus of the cylindrical segment 44 to a position proximate the distal tip 42. A drill point 48 for self-drilling the fastener is disposed adjacent the distal tip 42.

In one embodiment, the wafer flange 22 typically has a constant diameter which ranges from approximately 0.610 to 0.635 inches. The axial thickness of the flange 22 ranges from approximately 0.065 to 0.075 inches. The socket 26 has an axial recessed depth ranging from approximately 0.086 to 0.111 inches. The diameter of the cylindrical segment 44 is approximately 0.188 inches. The threaded segment 46 has a thread diameter which ranges from approximately 0.235 inches to 0.244 inches and a root diameter of approximately 0.172 inches. In the preferred embodiment, thread 47 is a standard #14 - 10 type AB thread. A type AB screw is defined by ANSI/ASME as a screw comprising a thread having first and second thread surfaces defining first and second planes, the planes intersecting at an angle of 60° relative to each other. The thread has a flat having a maximum width of 0.006 inches. It is well known in the art that the second number in such a term specifies the number of threads per inch. Therefore, a screw in accordance with the preferred embodiment has 10 threads per inch. The self-drilling point 48 typically defines an angle on the order of 30 degrees.

The axial length of the fastener shank 40 for preferred embodiments of fastener 10 is approximately 6, 7, 8, 9, 10, 11 or 12 inches. The axial length of the threaded segment 46 of the fastener 10 for such lengths is approximately 2 inches.

The fastener 10 is preferably manufactured from steel and is heat treated. The fastener 10 is anchored against the panel 12 so that the flange 22 is nearly co-planar with the outer exposed surface of the panel 12. Consequently, siding (not illustrated) can be mounted against the panel without the fastener head 20 extending into or through the siding.

While the preferred embodiments of the invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener for fastening an insulated wall panel to a structural member comprising:

head means comprising a wafer head having a generally planar top surface, an opposite underside and a generally uniform axial thickness of less than 0.100 inches and a diameter between 0.500 and 1.00 inches, a tapered segment extending from said underside;

recessed socket means for defining a socket through said wafer head for receiving a torque driver; and shank means extending longitudinally from a proximal portion adjacent said head means to a distal tip, said shank means comprising an unthreaded cylindrical segment having a first diameter, a threaded segment adjacent said cylindrical segment and generally uniformly longitudinally extending for approximately 2 inches and having first and second surfaces, said first and second surfaces defining first and second planes intersecting at an angle of substantially 60° and having a root diameter less than said first diameter and drilling point means for self-drilling said fastener at said tip.

2. The panel fastener of claim 1 wherein said socket has a square shape.

3. The panel fastener of claim 1 wherein said wafer head has a diameter which ranges from 0.610 to 0.635 inches.

4. The panel fastener of claim 1 wherein said wafer head has a thickness which ranges between 0.065 and 0.075 inches.

5. The panel fastener of claim 1 wherein the length of said fastener is approximately 6, 7, 8, 9, 10, 11 or 12 inches.

6. An assembly comprising:

a structure support member;

an insulated wall panel engaged against said support member;

fastener means for fastening said panel to said member comprising:

head means comprising a wafer head having a generally planar top surface, an opposite underside engaging said panel and a generally uniform axial thickness of less than 0.100 inches and a diameter between 0.500 and 1.00 inches wherein said top surface is approximately co-planar with said panel, a tapered segment extending from said underside into said panel and recessed socket means for defining a socket through said wafer head for receiving a torque driver;

shank means extending from a proximal portion adjacent said head means to a distal tip, said shank means having an unthreaded cylindrical segment having a first diameter and extending through said panel and a threaded segment adjacent said cylindrical segment and threadably anchored to said structural member, said threaded segment generally uniformly longitudinally extending for approximately 2 inches and having first and second surfaces, said first and second surfaces defining first and second planes intersecting at an angle of substantially 60° and having a root diameter less than said first diameter and drilling point means at said tip disposed in said structural member.

7. The assembly of claim 6 wherein said socket has a square shape.

8. The assembly of claim 6 wherein said wafer head has a diameter which ranges from 0.610 to 0.635 inches.

9. The assembly of claim 6 wherein said wafer head has a thickness which ranges between 0.065 and 0.075 inches.

10. The assembly of claim 6 wherein the length of said fastener is approximately 6, 7, 8, 9, 10, 11 or 12 inches.

11. A fastener for fastening an insulated wall panel to a structural member comprising:

head means comprising a wafer head having a generally planar top surface and an opposite underside and a generally uniform axial thickness which ranges from 0.065 and 0.075 inches and a diameter which ranges from 0.610 to 0.635 inches, a conical tapered segment extending from said underside;

recessed socket means for defining an axial socket through said wafer head for receiving a torque driver; and shank means extending axially from a proximal portion adjacent said head means to a distal tip, said shank means comprising an unthreaded cylindrical segment having a first diameter, a threaded segment adjacent said cylindrical segment and generally uniformly longitudinally extending for approximately 2 inches and having first and second surfaces, said first and second surfaces defining first and second planes intersecting at an angle of substantially 60° and having a root diameter less than said first diameter, and drilling point means for self-drilling said fastener adjacent said tip.

12. The fastener of claim 11 wherein the length of said fastener is approximately 6, 7, 8, 9, 10, 11 or 12 inches.

* * * * *